Jan. 25, 1966  L. W. PRAY ETAL  3,231,209
TWISTER FRAME
Filed Sept. 19, 1963  9 Sheets-Sheet 1

Jan. 25, 1966   L. W. PRAY ETAL   3,231,209
TWISTER FRAME
Filed Sept. 19, 1963   9 Sheets-Sheet 9

FIG. 14

United States Patent Office 3,231,209
Patented Jan. 25, 1966

3,231,209
TWISTER FRAME
Lester W. Pray, Gordon C. Anderson, and James Waddington, Clemson, S.C., assignors, by mesne assignments, to Maremont Corporation, Chicago, Ill., a corporation of Illinois
Filed Sept. 19, 1963, Ser. No. 310,109
18 Claims. (Cl. 242—26.4)

The present invention relates to improvements in a twister frame having thread guiding and control elements vertically movable with relation to package supporting spindles in accordance with a rising builder pattern, and more particularly to an improved mechanism for winding down preparatory for doffing and for re-establishing said traversing elements in predetermined starting positions.

It is a principal object of the invention to provide for use in a twister frame an improved wind-down mechanism which will operate automatically to position the several thread guiding and control elements in position for the doffing of the wound packages and the subsequent start of a new winding operation.

It is more specifically an object of the invention to provide novel wind-down and positioning mechanisms for the several thread guiding and control elements which are well adapted for automatic operation of the machine.

It is another object of the invention to provide novel means for moving the thread guides to an out of the way position preliminary to the doffing operation, and for thereafter returning said thread guides to their operating position.

It is another object of the invention to provide a novel device which is adapted to be operated simultaneously with the thread guide operating mechanism for moving said balloon guide rails and rings to and from a low inoperative position for doffing.

It is another object of the invention to provide a joggle mechanism which will operate automatically to effect a joggling of the ring rails and spinning rings associated therewith at the beginning of a new spinning operation following doffing.

With the above and other objects in view as may hereinafter appear, the several features of the invention consist in the devices, combinations and arrangement of parts hereinafter described and claimed which together with the advantages to be obtained thereby will be readily understood by one skilled in the art from the following description taken in connection with the accompanying drawings, in which:

The invention is herein disclosed as embodied in a twister frame which may be of ordinary description consisting of a long frame 20 having at each side thereof duplicate spindle rails 22 on which are mounted a series of rapidly rotating spindles 23. Inasmuch as the spindles together with their drive mechanism are well known and from specifically no part of the present invention, no particular illustration or description thereof is included herein.

The thread guiding and control elements by means of which the threads are guided to the spindles comprise, associated with each spindle rail, a ring rail 24 (see FIG. 2) having mounted thereon along the length of the machine a series of spinning ring holders 26, a pair of balloon control ring support bars 28 on each of which are mounted a series of balloon control rings 30, and a pair of thread guide supporting rods 32 on each of which there is mounted a series of thread guides 34. The ring rails 24 are supported at intervals along their length by means of tapes 36 which extend along the length of the machine and are provided at intervals with extensions passing around idler pulleys 38. Each tape 36 is secured at the base end to a pulley 40 secured to a windlass shaft 44 which extends transversely across one end of the machine.

Figure 1:
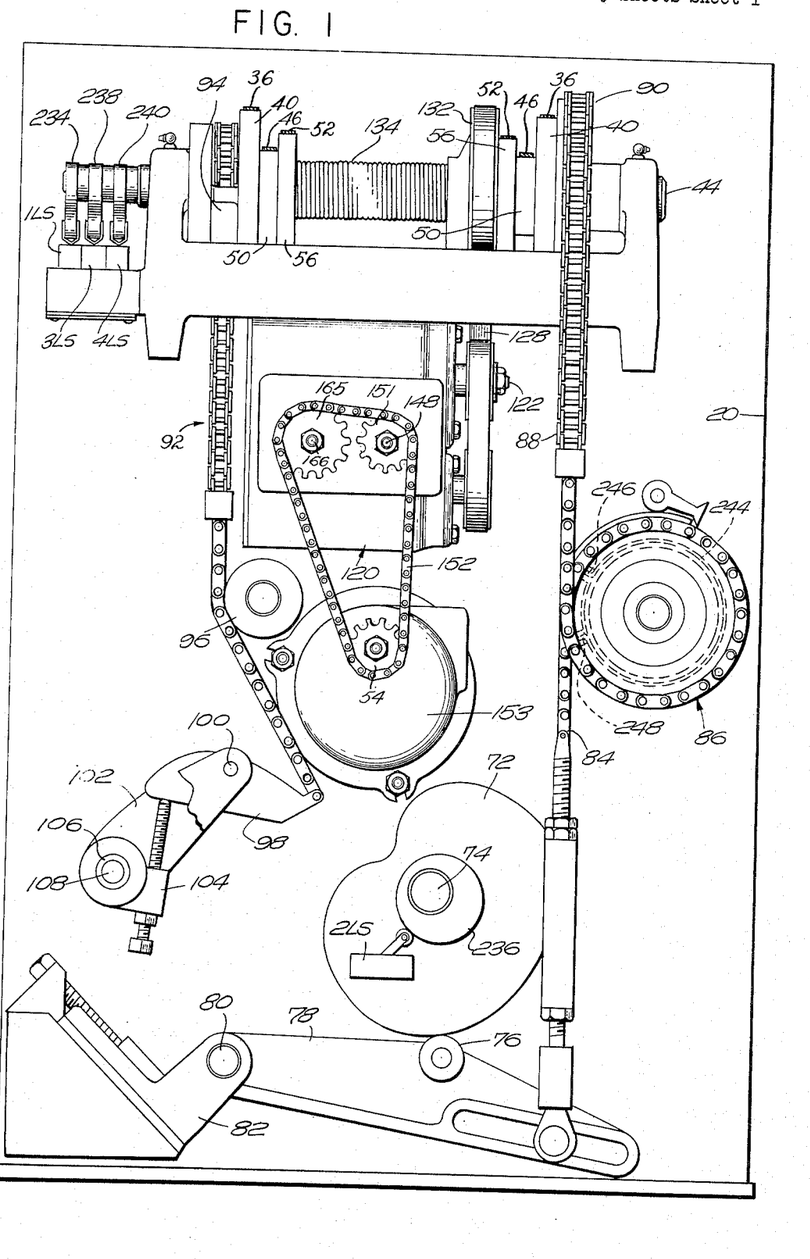
FIG. 1 is a somewhat fragmentary view of the builder and wind-down mechanisms for a twister frame looking from the inside toward the end of the machine.
Figure 3:
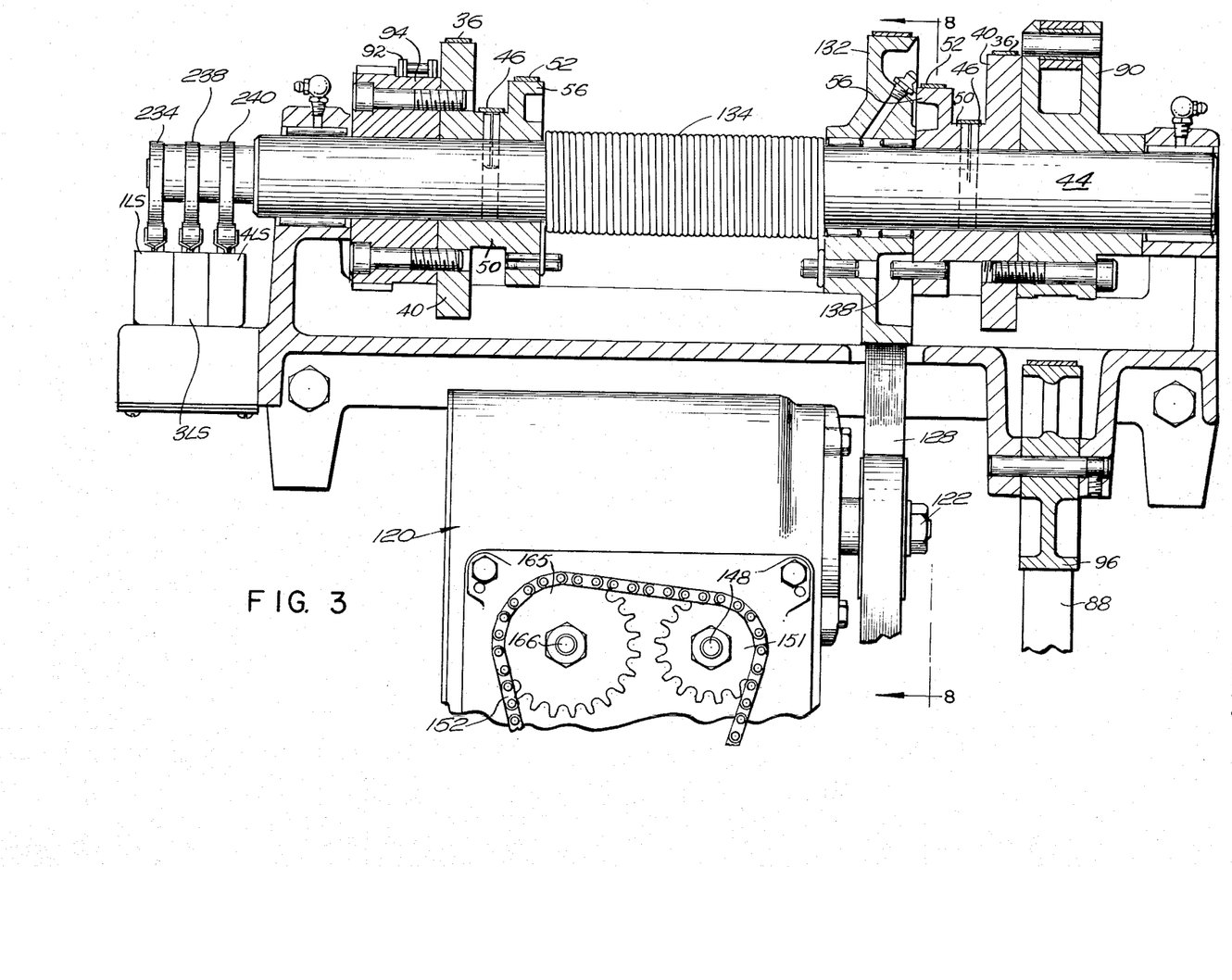
FIG. 3 is a sectional view in elevation on a large scale of the windlass shaft and portions of the drive for the wind-down mechanism shown in FIG. 1.
Figures 8, 9, 10:
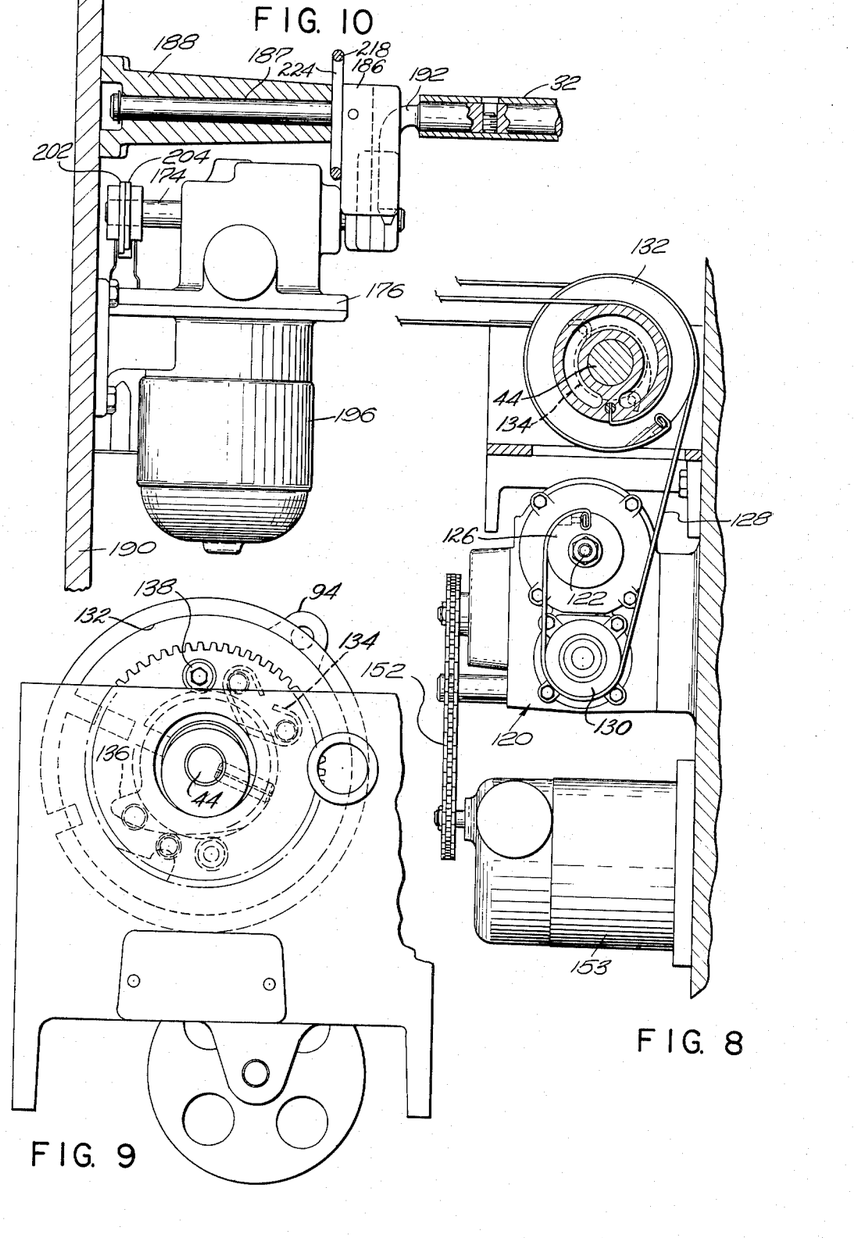
FIG. 8 is a view looking from the right of FIG. 3 taken along a section line 8—8 to illustrate particularly the arrangement of the wind-down drum, the flexible wind-down tape, and the wind-down and joggle mechanisms connected therewith.
FIG. 9 is a somewhat fragmentary end view of the windlass shaft and mechanism supported thereon looking from the left of FIG. 3.
FIG. 10 is a rear side elevation, partly in section, illustrating the motor and certain operating connections for moving the thread guide rails and balloon ring rails to and from their inoperative positions, said motor and operating connections being located at the further end of the machine opposite from the windlass shaft.

The thread guide supporting rods 32 are mounted on tapes 46, each of which extends along the length of the machine and is provided at intervals with extensions which pass around supporting rollers 48. The tapes 46 are secured at their base ends to pulleys 50 secured to the windlass shaft 44 (FIGS. 1, 3 and 8).

The balloon control rails 28 are similarly supported by tapes 52 which at their base ends are secured to pulleys 56 fastened on the windlass shaft 44 and toward their outer ends are similarly provided with extensions which pass around supporting rollers 54.

The illustrated machine is provided with a builder mechanism which is similar in many respects to that shown in Anderson et al. Patent No. 3,072,350, dated January 8, 1963, for Builder Mechanism. As generally shown in FIG. 1, the builder mechanism comprises a builder cam 72 mounted on a builder cam shaft 74 and adapted to be engaged by a follower 76 on a builder cam lever 78 extending horizontally beneath the builder cam. The cam lever turns about a pivot 80 on a machine bracket 82, and is connected with the lower end of an adjustable link chain 84. At its upper end the chain 84 is connected with a pick mechanism generally designated at 86, which is in turn connected by means of a link chain 88 with a pulley 90 secured to the windlass shaft 44.

There is also connected to the windlass shaft 44 the compensating tension assembly which acts to rotate the windlass shaft 44 in a direction counter to the thread guide balloon control ring and spinning ring supporting the tapes. Said compensating tension assembly comprises a chain 92 which is connected at its upper end to a pulley 94 secured to the windlass shaft 44. The chain 92 extends downwardly around a guide roller 96 and is connected at its lower end to a cam member 98 which is adjustably mounted on a pivot pin 100 between a pair of arms 102 formed on a bracket 104 which is rotatably supported on a bearing member 106 and is rigidly secured at one end to a torsion bar 108 to rotate therewith about the torsion bar axis. The torsion bar 108 is placed under a twisting or torsion strain which serves to exert a downward bias on the chain 92 sufficient to overbalance the bias of the several tapes attached to the windlass shaft.

The builder mechanism above generally referred to is arranged to operate in the following manner:

The builder shaft 74 and cam 72 are positively driven to produce a cylclical up-and-down movement of the builder cam follower lever 78 to produce a reciprocatory movement of the ring rail and associated parts in accordance with a recurring winding pattern. At regular intervals during this operation, the pick mechanism 86 is operated to slightly increase the length of chain 88 and thereby to gradually lift the reciprocating pattern of winding effected by the operation of the builder cam 72.

For a more complete illustration and description of the builder mechanism, reference may be had to the Anderson et al. Patent No. 3,072,350, above referred to.

The wind-down mechanism comprises a housing 120 in which are mounted a horizontally disposed wind-down shaft 122, and a joggle shaft 124 located vertically beneath the wind-down shaft 122. A wind-down pulley 126 secured to the projecting end of the wind-down shaft 122 provides an anchor support for one end of a flexible tape 128 which passes downwardly around a joggle pulley 130 on the parallel joggle shaft 124 and is then directed upwardly to a wind-down drum 132. As best shown in FIGS. 3, 8 and 9, the drum 132 is loosely supported to turn on the windlass shaft 44 and is normally biased in a direction which tends to wind the tape onto the wind-down drum by means of a torsion spring 134 which is coiled about the shaft 44 and is connected at one end to the drum 132 and at its other end to one of the rollers fixed to the windlass shaft 44.

Figure 5:
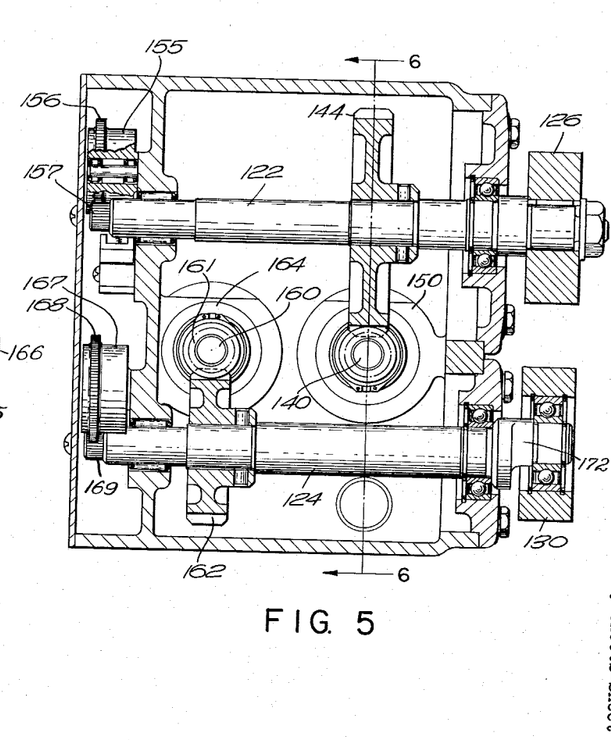
FIG. 5 is a sectional view taken on a line 5—5 of FIG. 4 illustrating the wind-down and joggle shafts and the driving clutches connected thereto.
Figures 6, 7:
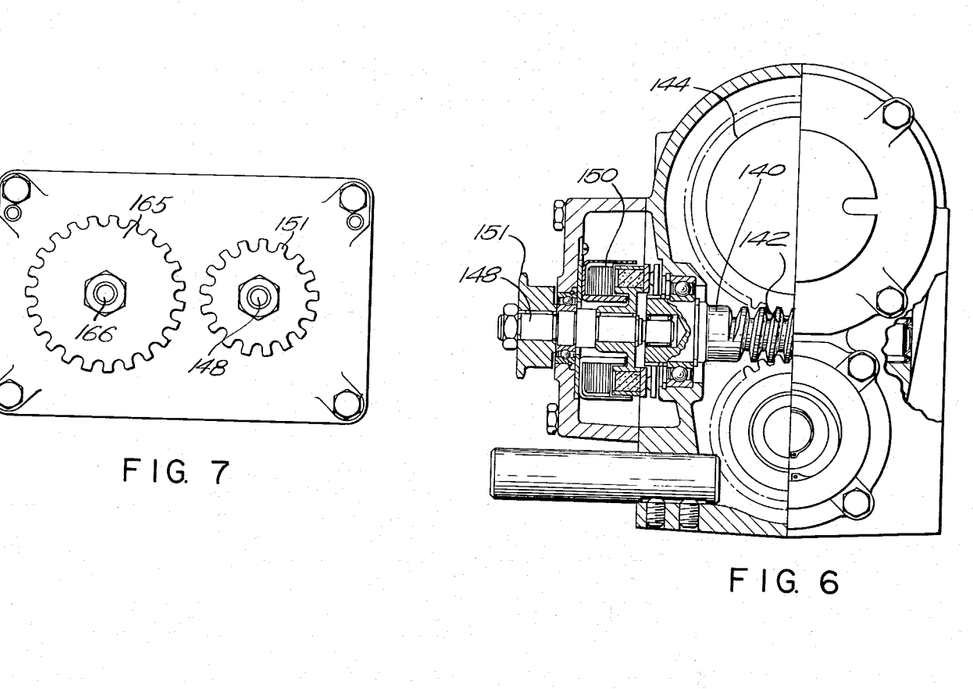
FIG. 6 is a view looking from the right end of FIG. 5, parts being broken away and sectioned along a line 6—6 of FIG. 5 to illustrate underlying parts.
FIG. 7 is a detail view looking from the left of FIG. 6 illustrating the driving sprockets from which the wind-down and joggle shafts and their respective clutches are driven.

During the wind-down operation the wind-down shaft 122 is driven to rotate the drum 132 against the pressure of spring 134 (FIG. 9) causing a cam abutment 136 formed on the drum to engage a stop pin 138 on an adjacent pulley fixed to the windlass shaft 44 so that the windlass shaft is rotated in the wind-down direction. The mechanism for operating the wind-down shaft 122 comprises a wind-down clutch shaft 140 (see FIGS. 5 and 6) horizontally disposed beneath the wind-down shaft and at right angles thereto within the housing 120, and having formed thereon a worm 142 which meshes with a worm gear 144 on the wind-down shaft. A short clutch drive shaft 148 is aligned with the clutch shaft 140 and is freely rotatable with relation thereto. The clutch shaft 140 and aligned shaft 148 are arranged to be connected to move as a unit by means of an electro-magnetic clutch 150, the cooperating elements of which are mounted in the two shafts. At its outer end the aligned shaft 148 has secured thereto a driving sprocket 151 which meshes with a driving chain 152 driven by means of a clutch motor 153 (see FIG. 8) and with the driving sprocket 154 connected with the armature shaft of the motor. A wind-down clutch timing cam 155 mounted adjacent the rear end of the wind-down shaft 122 is arranged to be driven in timed relation thereto by means of a timing gear 156 to which the cam is secured and a meshing pinion 157 on the shaft. A microswitch 9LS having a cam follower arm 159 is arranged to be actuated by said cam.

Figure 4:
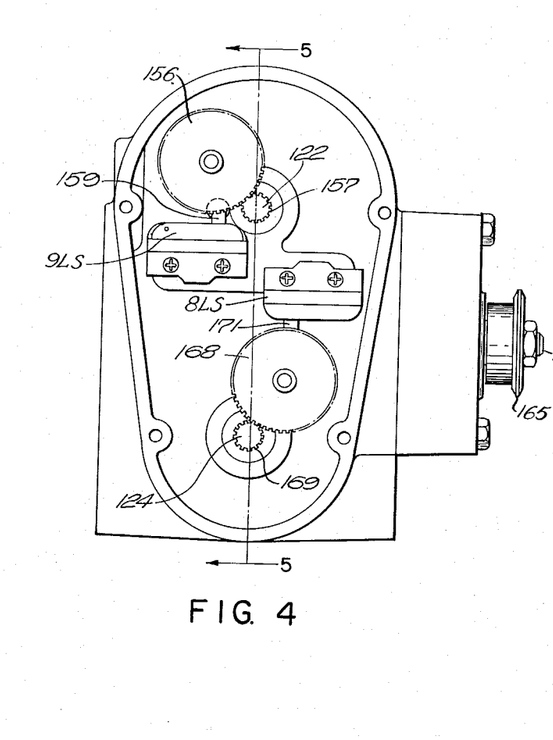
FIG. 4 is a view in elevation looking from the left of FIG. 3 illustrating specifically the housing for the wind-down and joggle mechanisms.

The joggle shaft 124 is arranged to be driven from the clutch motor 153 and sprocket chain 152 through connections which include a joggle clutch shaft 160 (see FIG. 5) supported in the same horizontal plane and parallel to the wind-down clutch shaft 140 between the vertically spaced wind-down shaft and joggle shaft. A worm 161 on the joggle drive shaft engages the worm gear 162 on the joggle shaft 124. The joggle clutch shaft 160 is supported in axial alignment with a short drive shaft 166 being connected thereto by means of a joggle electro-magnetic clutch 164. This arrangement is similar to the wind-down clutching arrangement described above. A sprocket 165 secured to the outer end of the short shaft 166 (FIGS. 3 and 7) is engaged to be driven by the driving sprocket chain 152 and clutch motor 153. As will be noted particularly from FIG. 5, the joggle pulley 130 is rotatably supported on an offset bearing support 172 on the joggle shaft 124 so that rotation of the joggle shaft 124 causes the offset joggle pulley 130 to move bodily in a circular path. This bodily movement, taking place while the wind-down pulley 126, and end of the wind-down tape anchored thereto are held stationary has the effect of rocking the wind-down drum and thus of imparting an up-and-down joggling movement to the several thread guiding and control elements including the ring rails. A joggle clutch timing cam 167 (see FIG. 5) mounted adjacent the rear end of the joggle shaft 124 is arranged to be driven in timed relation thereto by means of a timing gear 168 (see FIGS. 4 and 5) to which the cam is secured and a meshing pinion 169 on the shaft. The micro-switch 8LS having a cam follower arm 171 is arranged to be actuated by said cam.

Figures 2, 12:
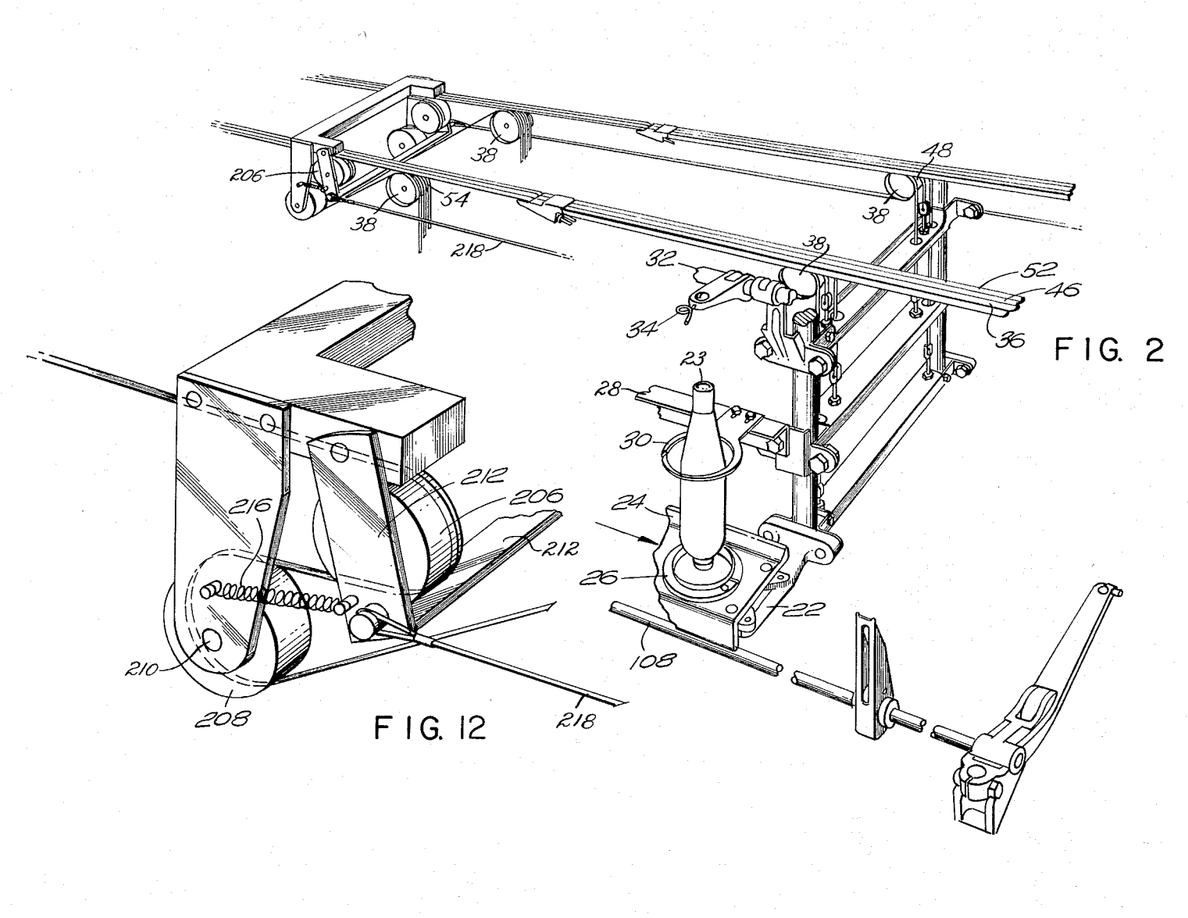
FIG. 2 is a somewhat diagrammatic view in perspective illustrating particularly the arrangement of the thread guiding and control elements including ring rails, balloon guide rails, and thread guide rods together with the lifter tapes from which said elements are suspended and the devices for operating said tapes.
FIG. 12 is a detail perspective view on an enlarged scale of the mechanism for letting off the tapes for supporting the balloon ring rails so that the balloon rings are moved to a low doff position.
Figure 11:
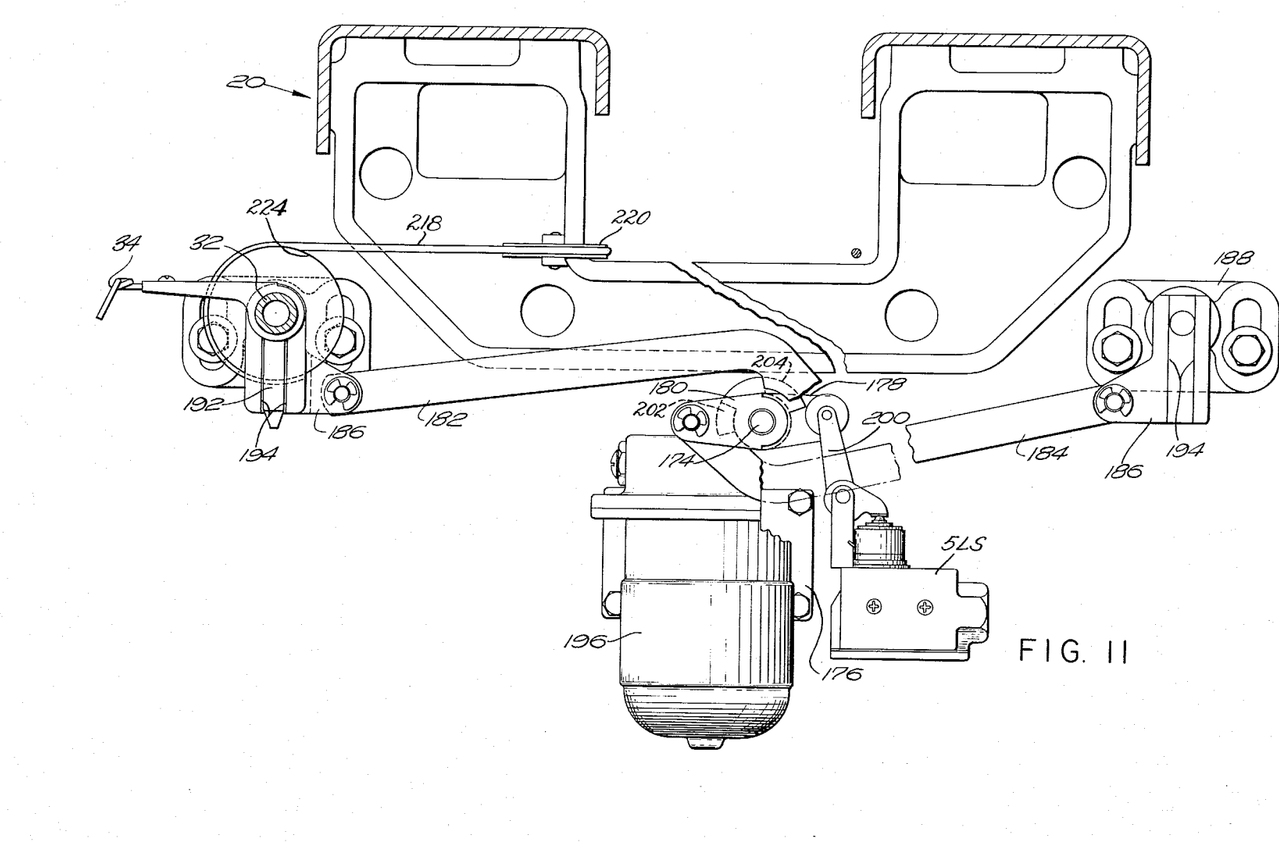
FIG. 11 is a view looking outwardly toward said further end of the machine illustrating particularly the mechanism for removing the thread guides and ring rails to and from their inoperative position.

The mechanism is provided which is rendered operative by the wind-down mechanism to move the thread guides to a raised inoperative position for the doffing operation, said mechanism being operated thereafter to return the thread guides to their normal operation position. As best shown in FIGS. 2 and 11, the thread guides 34 are normally supported in a horizontal outwardly projecting position on their respective rods 32. During the wind-down operation, each of the thread guide supporting rods 32 is rotated through 90° causing the respective thread guides to be moved upwardly out of the way. The mechanism for effecting said rotating movement comprises a rock shaft 174 supported on a bracket 176 to turn about an axis lengthwise of the machine. Two oppositely disposed crank arms 178, 180 secured to rock shaft 174 are connected respectively to crossed links 182, 184 which are connected at their outer ends to rotatable elements 186 arranged for imparting the desired rocking movements to the respective thread guiding supporting rods 32. As best shown in FIGS. 10 and 11 each of the rotatable elements 186 is secured to a rock shaft 187 rotatably mounted in a bracket 188 secured to the end wall 190 of the machine remote from the windlass shaft 44. The brackets 188 are supported for vertical adjustment on said wall so that the pivotal axis of the rotatable elements 186 will be aligned with the respective thread guide supporting rods 32 for the position taken by the rods 32 when the rocking movement of said rods takes place. A downwardly extending pin 192 secured to the end of the respective guide rod 32 for said aligned position of the rod and rotatable elements 186 rides in a vertically disposed slot 194 in the rotatable element 186.

The rock shaft 174 is driven one-half revolution to effect the rocking of the thread guides to their raised inoperative position, and is thereafter driven in the reverse direction one-half revolution to reposition the guide rods and thread guides in their operative positions by means of a reversible electric motor 196 which is connected by means of a worm and worm gear with the rock shaft 174. Operation of the motor 196 is controlled by means of electrical connections which include a micro-switch 5LS and a switch actuating arm 200 having a follower roll adapted to be acted upon by two limit cams 202, 204 on the rock shaft 174.

In connection with the wind-down operation preparatory for doffing and for conditioning the machine for a new winding operation, mechanism is provided which acts at the same time that the thread guides are moved to inoperative position to move the balloon control rings to an extreme low position in which they will not interfere with the doffing operation. Subsequently the balloon control rings are returned to their normal operating position at the same time that the thread guides are returned to their normal operating position. To this end each balloon ring rail lifter tape 52 passing from the windlass shaft is arranged to pass around a rovable roller 206, then in a reverse direction around the roller 208, and finally in a forward direction over the supporting rollers 54. The rollers 208 are supported to turn on a pivot shaft 210 fixedly supported on the machine. The movable rollers 206 are supported on a depending U-shaped frame 212 which is pivotally mounted on an overhead support on the machine. The pivoted U-shaped frame 212 is acted upon by a tension spring 216 which tends to move the rollers 206 toward the windlass drum and thereby to increase the effective length of the balloon rail lifter tapes which in turn causes the balloon rings to be moved downwardly from their normal operating position. The movable rollers 206 are normally held in a relatively advanced operating position by means of two tapes 218 which are connected to opposite sides of the U-shaped frame 212 and which extend along the length of the machine to the opposite end thereof where they pass respectively around pulleys 220, and thence outwardly being attached to rocker arms 224 secured respectively to the rotatable elements 186. With this arrangement it will be recognized that the operation of the thread guide lifter mechanism to raise the thread guides will simultaneously cause the tapes 218 to be let off so that the movable rollers 206 are moved under the influence of their spring 216 to lower the balloon rings. The subsequent operation of the thread guide lifter mechanism to return the thread guides to operative position simultaneously by drawing in the tapes 218 returns the movable rollers 206 to their normal operating position and thus re-establishes the balloon control rings in their normal operating position.

Figure 13:
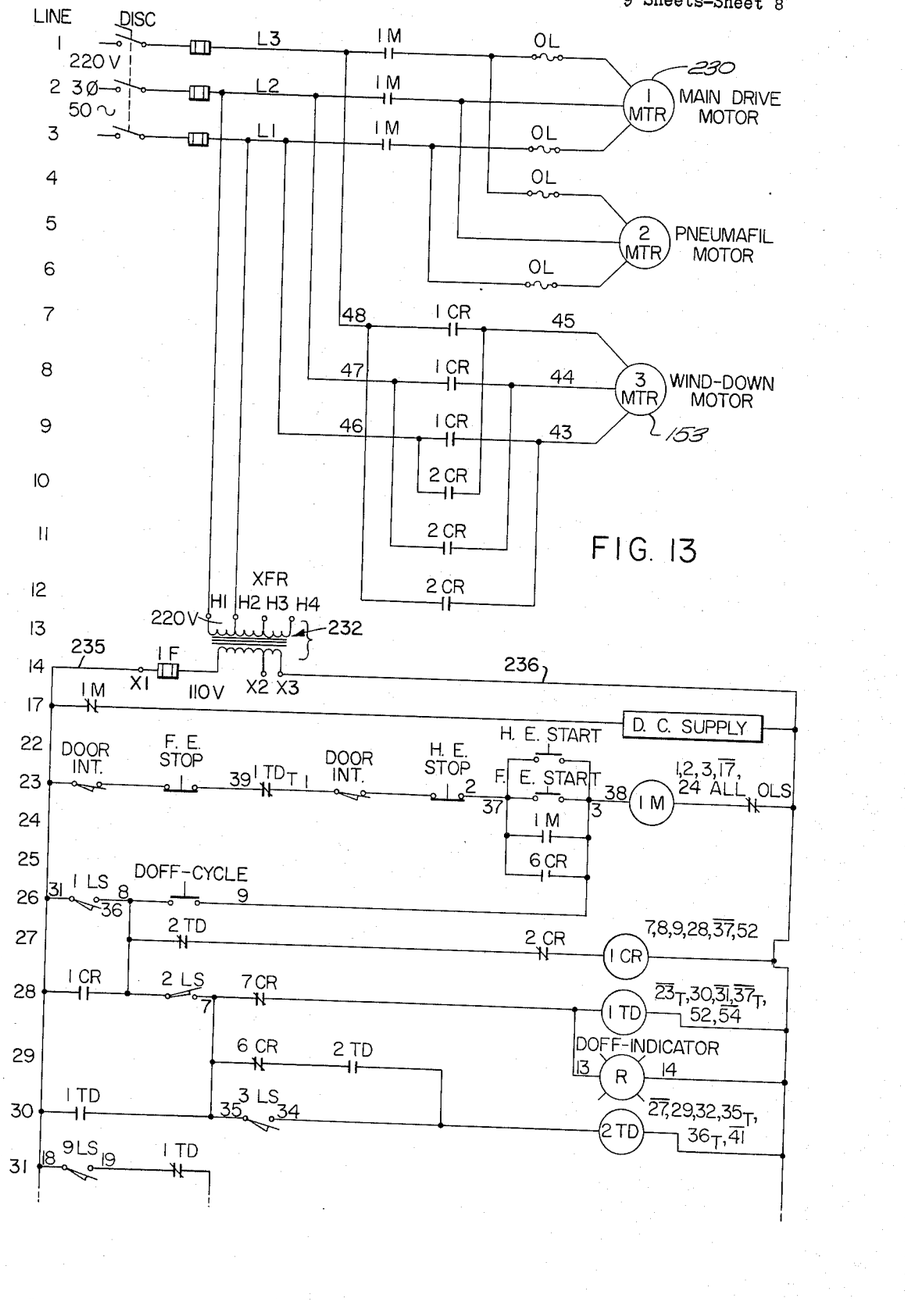
FIGS. 13 and 14 constitute the two parts of an electrical diagram of the electrical controls employed for the automatic operation of the twister frame during the wind-down, doffing and resetting portions of the machine cycle.
Figure 14:
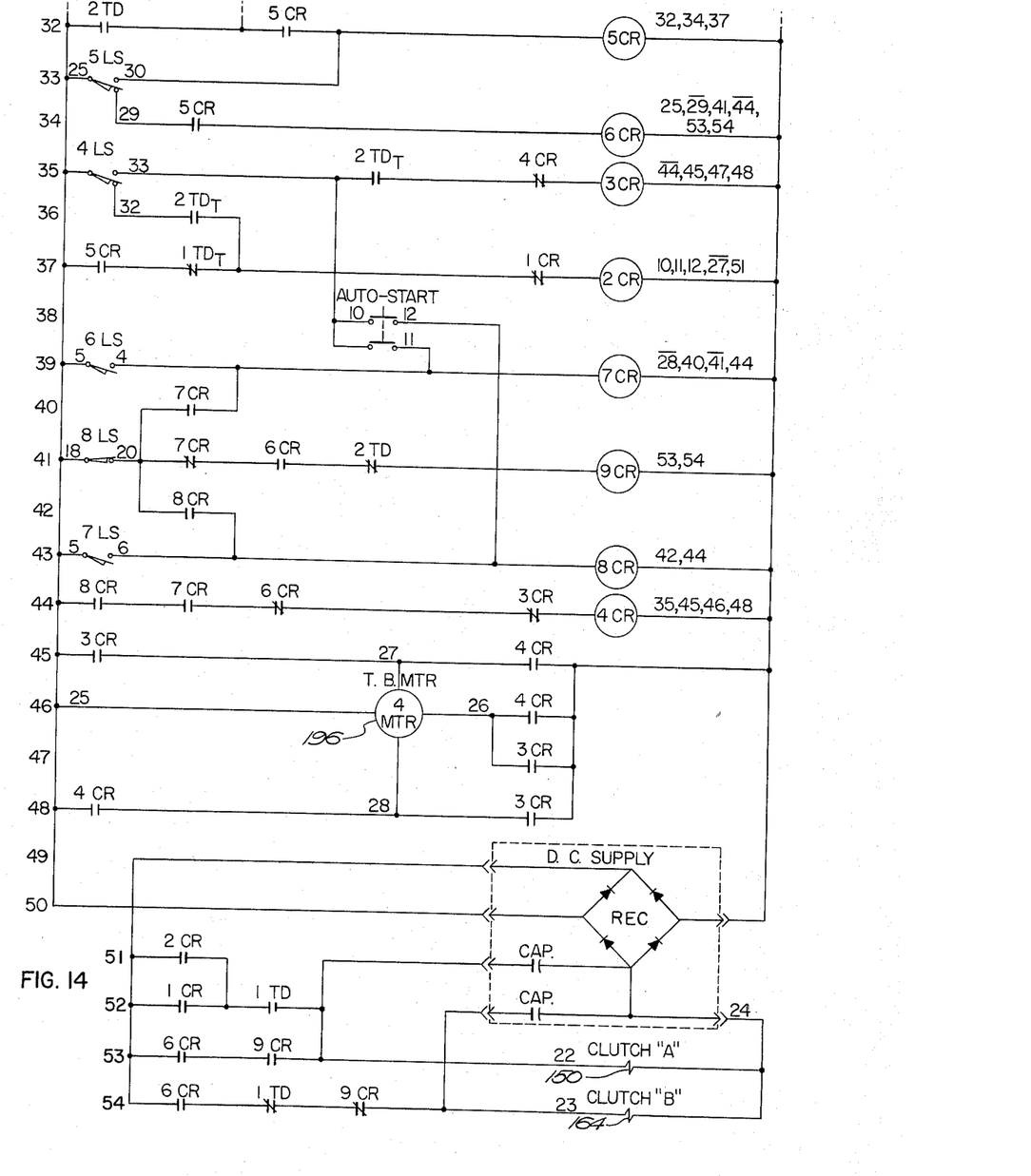

An electrical control system is provided for effecting the automatic operation of the mechanisms described for winding down and for positioning the thread guiding and control elements for doffing and for re-establishing said elements in position for a new winding operation. Referring to the electrical diagram of FIGS. 13 and 14, the main machine motor 230 and the wind-down clutch motor 153 are connected to be driven from a three-phase line L1, L2, L3, the clutch motor 153 being further connected for reversal through the operation of relay switches 1CR and 2CR as hereinafter set forth. Current is supplied for operating the several operating switches and relays of the control circuit by means of a transformer 232 which is connected with a supply lead 235 and a return lead 236 of the control circuit. The several switches and relays employed in connection with the operation of the devices above described will be identified more particularly in connection with the following statement of operation. The Pneumafil motor shown is a suction fan motor not further referred to as forming no part of the invention. The cross lines of the diagram have been consecutively numbered. The numbers appearing adjacent each of the several switch relays refer to these cross lines and indicate presence of switch contacts controlled by said solenoids in the cross lines designated. The several start and stop switches shown in line 23 of FIG. 13 include a number of door interlock and emergency stop switches which are not necessary to an understanding of the invention and will not be hereinafter referred to.

The operation of the wind-down and positioning mechanisms is as follows:

It will be understood that during the spinning operation these mechanisms are completely inoperative. At this time the ring rail is reciprocating in the conventional manner to complete the build-up on the bobbins and the flexible lifter tapes 36, 46, 52 are being wound on the pulleys on the windlass shaft 44.

At this time, referring to line 23 of the diagram, the main motor switch 1M is energized, all of the several emergency and operating station stop switches Door Int., F.E. Stop, H.E. Stop, and the holding switch contact 1M on line 24 being closed. Main motor switch contacts 1M in each of lines 1, 2 and 3 are held in by the main switch solenoid 1M so that the main drive motor is running.

Just as the bobbins become full, a cam 234 on the windlass shaft actuates a mirco-switch 1LS which energizes relay 1CR closing 1CR contacts, see lines 7, 8 and 9 of the electrical diagram, to start the wind-down clutch motor 153, driving the sprockets 151 and 170 for the respective wind-down clutch 150 and joggling clutch 164. 1CR contact, line 28, closes forming a holding circuit, 1CR contact, line 37, opens disabling relay 2CR, and 1CR contact, line 52, closes.

Subsequent to the starting of the clutch motor an auxiliary cam 236 mounted on the main cam shaft 74, see FIG. 1, actuates a micro-switch 2LS (see line 28 of the diagram) which causes relay 1TD to be energized closing contact 1TD, (see line 52 of the electrical diagram) while 1TD contact, line 54, for clutch 164 opens. Since the relay switch 1CR contacts, on line 52 of the diagram, are already closed the wind-down clutch 150 is now energized. The wind-down of the ring rails is thus orientated with relation to the rotation of the main cam shaft. The drive from the wind-down motor is now transmitted through the clutch 150 and wind-down shaft 122 causing the flexible tape 128 to be wound from the wind-down drum 132 onto the wind-down pulley 126, thus rotating the wind-down drum 132. After the wind-down drum is rotated a short distance, the abutment 136 engages with the stop pin 138 causing the windlass shaft to rotate with the drum 132 in the wind-down direction paying out the lifter tapes and thereby lowering the thread guiding and controlling elements including the ring rails 24. As the windlass shaft is thus turned in the wind-down direction, the pick motion 86 is reset by means of a spring take-up mechanism not shown which acts to effectively shorten the length of link chain 88 connecting the pick motion 86 with the drum 90 on the windlass shaft 44. Since the pick mechanism has been fully illustrated and described in the U.S. Patent No. 3,072,350, above referred to, it is believed unnecessary to reproduce the details of said mechanism.

The energizing of the relay 1TD also causes the 1TD contact, (see line 23 of the diagram), to open after a slight delay thus opening the main motor switch relay 1M to stop the main motor after a few turns, this operation taking place approximately at the same time that the ring rail reaches its lowest point.

1TD contacts on lines 30 and 54 open, and those on lines 31 and 37 open, the latter after a timed delay.

When the ring rail has reached its lowest position, a cam 238 on the windlass shaft 44 engages the contact arm of a limit switch 3LS (line 30) energizing relay 2TD. The 2TD contacts (see line 27 of the diagram)

open, thus deenergizing the relay 1-CR to disconnect the down drive switch connections for the wind-down motor. It is noted that 2TD contact, line 29, closes forming a holding circuit, 2TD contacts on lines 32 and 35 open and 2TD contact on line 41 opens. The 2TD relay contacts (see line 36 of the diagram) close so that the relay 2CR is energized engaging the 2CR motor switch contacts 2CR, lines 10, 11 and 12, to drive the wind-down clutch motor 153 in the reverse or upward direction. 2CR contact, line 27, opens deenergizing relay 1CR, and 2CR contact, line 51, closes.

The operation of the clutch motor in the up direction is continued until the ring rail has been moved upwardly from its bottom position to a position approximately 1⅝" above the low point. This is the doff position of the ring rail, and, for convenience, may be described as a preliminary doff position to which all of the traversing elements are brought as a group by the rotation of the windlass shaft 44.

As the ring rail reaches this predetermined positon, a cam 240 on the windlass shaft actuates the mirco-switch 4LS (see line 35 of the diagram) thus disconnecting the relay 2CR so that the up feed 2CR motor switch contacts are dropped out to stop the clutch motor 153. 2CR contact, line 29, closes preparatory for the energizing of relay 1CR. Said movement of the switch arm 4LS at the same time energizes the relay 3CR closing the 3CR contacts on lines 47 and 48 to start the auxiliary thread guide motor 196 in the direction required to raise the thread guides. It will be noted that for the preliminary doff position of the windlass shaft 44 and traversing elements supported thereby, the twisting frame and the wind-down mechanism previously described are now completely inoperative, and except for the raising of the thread guides and simultaneous down movement of the balloon guide rings now about to take place the twister frame is ready for the doffing of the full thread packages.

The operation of the auxiliary motor 196 rotates shaft 174 and associated connections in a direction to swing the thread guides upwardly. This movement continues until a limit cam 202 on the rock shaft 174 engages a plunger in the mirco-switch 5LS to shift same upwardly and thereby to arrest the movement of the auxiliary motor 196. Relay 5CR is energized. Contact 5CR in line 32 closes forming with contact 2TD a holding circuit. 5CR contacts, lines 34 and 37, close setting up relays 6CR and 2CR for subsequent operation.

The thread guides 34 are now in their vertically raised position, and the balloon ring rails 28, connected for operation therewith through strips 218, will have been fully lowered to the doffing position by the letting off of the tapes 218.

It is contemplated that the frame may now be doffed either manually or by an automatic doffer which, however, forms no part of the present invention and is not here shown. As the doff on the left and right side of the frame respectively is completed, the doffer acts to close the limit switches 6LS and 7LS, respectively. When both switches are closed a circuit is completed which starts the auxiliary motor 196 to position the thread guides and balloon rings rails, and starts the wind-down clutch motor 153 in the up direction.

Limit switch 6LS energizes relay 7CR (see line 39 of the diagram). Limit switch 7LS energizes relay 8CR (see line 43). Contact 7CR, line 40, closes making a holding circuit. Contacts 7CR in lines 28 and 41 open to prevent energizing of relay 1TD and 9CR. Contact 8CR, line 42, closes forming a holding circuit for relay 8CR. 7CR and 8CR contacts (on line 44) close energizing relay 4CR closing 4CR contacts on lines 45 and 46 to start the auxiliary motor 196 in reverse. The auxiliary motor 196 now rotates the rock shaft 174 through 180° in the reverse direction to its original position. At this point a second abutment 204 on the pivot shaft 174 contacts the switch arm 200 actuating limit switch 5LS which energizes relay 6CR so that switch contacts 6CR on line 44 of the diagram open deenergizing relay 4CR to stop the auxiliary motor 196. The arrangement of the relays referred to is such that with the stopping of the auxiliary motor the electrical connections thereto are again reversed preparatory to the next doff.

The actuation of the limit switch 5LS in addition to stopping the auxiliary motor, acts also to start the main motor 230 and the joggle clutch 164.

The relay 5CR has been previously energized so that the several 5CR switch contacts are already engaged. The relay 6CR is now energized causing 6CR switch contacts on line 25 of the diagram to close starting the main motor 230. The 6CR switch contacts 6CR on line 54 close engaging the electro-magnetic joggle clutch 164. Contact 6CR, line 29 opens breaking the holding circuit for relay 2TD. Contacts 6CR, lines 41, 53 and 54 close and that on line 41 opens to deenergize relay 9CR.

As previously pointed out the movement of the wind-down mechanism to the extreme down position followed by the upward movement of same to starting position has the effect of resetting the builder mechanism for the extreme down position so that, as the ring rails are allowed to rise again to the normal start position, the windlass shaft is supported entirely by the resilient wind-down tape, thus producing some slack in the builder tapes 84 and 88, as more fully set forth in the Anderson et al. U.S. Patent No. 3,072,350, above referred to. The resetting of the builder mechanism including chains 84, 88 and pick mechanism 86 is effected by means of a torsion spring 244 generally indicated in FIG. 1 of the drawings which rotates the relatively movable parts of the pick mechanism 86 to which the chains are attached to an extent determined by engagement with two adjustable stops 246 and 248 which are movable respectively with the chain 88 and with the chain 84, and which are set for engagement to limit the resetting movement of the builder mechanism in a position which corresponds with the wind-down of the windlass shaft and thread guiding and controlling elements to the extreme down position. The rotation of the joggle shaft 124 and the offset joggle pulley 130 produces a slight but distinct joggling of the ring rail which has the beneficial effect of greatly reducing the number of ends down which may occur in starting of the frame after doffing. After the joggle shaft is rotated a predetremined number of complete revolutions, which may, for example, be four, the timing cam 167 will actuate the micro-switch 8LS (see line 41 of the diagram) which deenergizes relay 9CR causing 9CR switch contacts on line 54 to drop out thus deenergizing the joggle clutch 196. Contact 9CR, on line 53, opens deenergizing clutch 150.

Simultaneously with the cutting off of the joggle clutch, the wind-down clutch is reenergized so as to pay off the flexible tape 128 wound on the wind-down pulley 126. The spring-loaded wind-down drum 132 on the windlass shaft automatically takes up the tape 128 as it is paid out. During that paying out the slack is taken out of the builder mechanism chains 84, 88 so that the ring rail is once again controlled by the builder cam 72 and builder motion in the conventional manner. When the tape is fully paid out the timing gear 155 actuates the micro-switch 9LS (see line 31 of the diagram) which deenergizes the wind-down clutch 150, cuts off the clutch motor 153, and again reverses the polarity of the clutch motor leads preparatory to winding the ring rail down and the bobbins become filled again. Referring to the electrical diagram it will be seen that when the limit switch 9LS is opened relay 5CR is deenergized so that 5CR switch contacts on lines 32, 34 and 37 drop out. Relay 2CR is deenergized to stop the clutch motor 153. Relays 6CR and 9CR are deenergized causing switch contacts 6CR and 9CR on line 53 of the diagram to drop out thus disengaging the wind-down motor clutch 150.

Even though the present invention is intended to be used with an automatic doffing mechanism it will be understood that the several features of the invention may be equally well employed in a machine that is doffed mechanically and in which the operator closes a starting switch following the doff in order to restart the frame.

While the invention is herein disclosed in a preferred form as applied to a twister frame it will be understood that the several features of the invention are equally applicable to spinning and other basically similar machines, the term twister frame as here employed being intended to include such machines.

The invention having been described what is claimed is:

1. In a twister frame having traversing elements incluuding a ring rail and spinning rings mounted for reciprocatory movement for winding strand on a package, the combination of a builder mechanism, a windlass shaft, and flexible supporting means connected with said shaft for supporting said traversing elements, flexible actuating connections between the builder mechanism and windlass shaft including a pick mechanism, a wind-down mechanism comprising a wind-down shaft, a flexible wind-down connection between said wind-down shaft and said windlass shaft for winding down said elements, means for rewinding said flexible actuating connections to an extent corresponding with the wind-down of said windlass shaft and said traversing elements to a maximum down position, means holding said flexible actuating connections in said maximum wind-down position, and a control device acting when said windlass shaft and said traversing elements are wound down to a predetermined maximum down position for driving said windlass shaft a limited distance in the reverse direction and for correspondingly raising said traversing elements thereby providing slack in said connections between the builder mechanism and windlass shaft at the start of a new package winding operation.

2. In a twister frame having traversing elements including a ring rail and spinning rings mounted for reciprocatory movement for winding strand on a package, the combination of a builder mechanism, a windlass shaft, flexible supporting means connected with said shaft for supporting said traversing elements, flexible actuating connections between the builder mechanism and windlass shaft including a pick mechanism, and means biasing said windlass shaft and flexible actuating connections against the builder mechanism, a wind-down mechanism comprising a wind-down shaft, a flexible wind-down connection between said wind-down shaft and said windlass shaft for winding down said elements, a joggle mechanism including a joggling element movable against said flexible wind-down connection, vibratory supporting means for said joggling element operable to joggle said windlass shaft traversing elements, and means for actuating the vibratory supporting means.

3. In a twister frame having traversing elements including a ring rail and spinning rings mounted for reciprocatory movement for winding strand on a package, the combination of a builder mechanism including a builder cam, a windlass shaft, and flexible supporting means connected with said shaft for supporting said traversing elements, flexible actuating connections between the builder cam and windlass shaft including a pick mechanism, means biasing said windlass shaft and flexible actuating connections against the builder cam, a wind-down mechanism comprising a wind-down shaft, a flexible wind-down connection between said wind-down shaft and said windlass shaft for winding down said elements, a joggle mechanism including a joggling element movable against said flexible wind-down connection, vibratory supporting means for said joggling element operable to joggle said windlass shaft and traversing elements, and actuating means operable in starting said twister frame to impart a limited vibratory movement to said vibratory supporting means for a limited period.

4. In a twister frame having traversing elements including a ring rail and spinning rings mounted for reciprocatory movement for winding strand on a package, the combination of a builder mechanism including a builder cam, a windlass shaft, and flexible supporting means connected with said shaft for supporting said traversing elements, flexible actuating connections between the builder cam and windlass shaft including a pick mechanism, a wind-down mechanism comprising a wind-down shaft, a wind-down drum on said windlass shaft, a flexible wind-down connection between said wind-down shaft and said drum, a joggle shaft and a joggle element supported eccentrically on said joggle shaft for engagement against said flexible wind-down connection, a reversible wind-down motor, separate clutch connections between said motor and each of said wind-down shaft and said joggle shaft, and a control mechanism for said twister frame operable for operating said motor in the wind-down direction and for engaging said wind-down clutch, control means rendered operative upon movement of said windlass shaft and traversing elements to a maximum low position to drive said motor and engaged clutch a limited distance in the reverse direction and thereafter to disengage said wind-down motor and clutch, and additional control means operable in starting the twister frame to operate said motor and to engage said joggle clutch for a limited period.

5. In a twister frame having traversing elements including spinning rings and a ring rail, a thread guide supporting rod, and normally horizontally disposed thread guides on said rod, the combination of a builder mechanism for imparting reciprocatory movements to said traversing elements including said thread guides and supporting rod in accordance with a rising reciprocatory pattern for winding strand on a package, means including a wind-down and positioning mechanism for winding down said traversing elements including said rod in a predetermined wind down position preliminary to doffing, and a thread guide supporting rod rotating device operable to rock said rod and thereby to position said thread guides in a raised inoperative doff position when said rod is in said predetermined wind down position.

6. In a twister frame having traversing elements including spinning rings and a ring rail, a thread guide supporting rod, and normally horizontally disposed thread guides on said rod, the combination of a builder mechanism for imparting reciproctory movements to said traversing elements in accordance with a rising reciprocatory pattern for winding strand on a package, means including a wind-down mechanism for positioning said traversing elements in a preliminary doff position, a thread guide rod rotating device comprising a rotary driver mounted at one end of the twister frame having its rotational axis in alignment with said rod for said preliminary doff position of said traversing elements, means connecting the rod in said aligned position to turn with said rotary driver, and power operated means for rotating said rotary driver and rod connected thereto between said normal thread guide position and a thread guide raised inoperative position.

7. In a twister frame having traversing elements including spinning rings and a ring rail, balloon control rings and a balloon ring rail, the combination of a builder mechanism for imparting reciprocatory movements to said traversing elements in accordance with a rising reciprocating pattern for winding strand on a package, means including a wind-down mechanism for positioning said traversing elements in a preliminary doff position, balloon control ring positioning mechanism operable for said preliminary doff position of the traversing elements to drop said balloon control ring rail and balloon control rings to a low doff position, and power operated means for actuating said balloon control ring positioning mechanism to shift said balloon control ring rail to and from said low doff position.

8. In a twister frame having traversing elements including spinning rings and a ring rail, balloon control rings and a balloon control ring rail, the combination of a builder mechanism for imparting reciprocatory movements to said traversing elements in accordance with a rising reciprocating pattern for winding strand on a package, a windlass shaft, and means operatively connecting the builder mechanism with the windlass shaft for effecting said reciprocatory movements, and flexible supporting members connected with said shaft for supporting each of said ring rail and said balloon control ring rail, biasing means acting on said windlass shaft for imparting an upward bias to said traversing elements, means including a wind-down mechanism connected with said windlass shaft for positioning said traversing elements in a preliminary doff position, and mechanism operable for said preliminary doff position of the builder mechanism to shift said balloon control ring rail and balloon rings to a removed doff position, which comprises a movable slack control support roller for said flexible balloon control ring rail supporting member shiftable between ring rail normal support and alternative removed doff positions, and a control device operable for said preliminary doff position of said traversing elements for shifting said roller to the doff support position and thereby to shift said balloon control ring rail to said removed doff position.

9. In a twister frame having traversing elements including spinning rings and a ring rail, balloon control rings and a balloon control ring rail, a thread guide supporting rod, and normally horizontally disposed thread guides on said rod, the combination of a builder mechanism for imparting reciprocatory movements to said traversing elements in according with a rising reciprocatory pattern for winding strand on a package, means including a wind-down mechanism for positioning said traversing elements in a preliminary doff position, an auxiliary driving means, connections from said auxiliary driving means operable for said preliminary doffing position of said traversing elements to move each of said thread guides and said balloon control rings to a withdrawn doff position, and means acting when rendered operative to actuate said driving means for moving said thread guides and balloon control rings to and from said withdrawn doff position.

10. In a twister frame having traversing elements including spinning rings and a ring rail, balloon control rings and a balloon control ring rail, thread guides and a thread guide supporting rod, the combination of a builder mechanism for imparting reciprocatory movements to said traversing elements in accordance with a rising reciprocatory pattern for winding strand on a package, a windlass shaft, and means operatively connecting the builder mechanism with said shaft and flexible supporting members connected with said shaft for supporting each of said ring rail, balloon control ring rail and thread guide supporting rod, means including a wind-down mechanism connected with said windlass shaft for positioning said traversing elements in a preliminary doff position, a thread guide rod rotating device comprising a rotary driver mounted at one end of the twister frame having its rotational axis in alignment with said rod for said wind-down position of the rod, and means connecting the rod in said aligned position to turn with said rotating driver, mechanism operable for said preliminary doff position of the builder mechanism to drop said control ring rail and balloon control rings to a low doff position, which comprises a movable slack control roller for said flexible balloon control ring rail supporting member shiftable between take-up and let off position, means including a flexible tape connecting between said roller and said rotary driver, and means operable for said preliminary doff position of said traversing elements for rotating said rotary driver to rock said thread guide supporting rod and simultaneously to shift slack control roller to lower said balloon control rod and rings to said doff positions.

11. In a twister frame having traversing elements for winding strand on a package, the combination of a builder mechanism for imparting reciprocatory movements to said traversing elements in accordance with a rising reciprocating pattern, said builder mechanism including a builder cam and follower, a windlass shaft and flexible supporting members connected with said shaft for supporting said traversing elements, flexible actuating connections between the builder cam follower and windlass shaft including a pick mechanism, and means biasing said windlass shaft and flexible actuating connections against the builder cam, and a wind-down mechanism comprising a wind-down shaft, a wind-down drum loosely supported on the windlass shaft, a flexible wind-down connection between said wind-down shaft and said wind-down drum for winding down said elements, biasing means connected between the wind-down drum and windlass shaft biasing said drum in a wind-up direction, and stops on said drum and on said windlass shaft arranged for engagement with one another to move the windlass shaft with the drum in the wind-down direction, and means for driving said drum in said wind-down direction for winding down said windlass shaft.

12. In a twister frame having traversing elements including spinning rings and a ring rail, balloon control rings and a balloon control ring rail, thread guides and a thread guide supporting rod, the combination of a builder mechanism for imparting reciprocatory movements to said traversing elements in accordance with a rising reciprocating pattern for winding strand on a package, a windlass shaft, means operatively connecting the builder mechanism with said shaft, flexible supporting members connected with said shaft for supporting each of said ring rail, said balloon control ring rail and said thread guide supporting rod, a wind-down mechanism connected with said windlass shaft for winding down said traversing elements to a predetermined wind-down position, a device for shifting the thread guide rod and thread guides up to an inoperative doff position, a device for shifting said balloon control ring rail and balloon control rings to an inoperative doff position, a drive mechanism operable for simultaneously shifting said devices between the normal and inoperative doff poistions, and automatic control mechanism including means actuated by movement of said traversing elements to the wind-down position to arrest the movement of said traversing elements in said predetermined wind-down position, and means actuated simultaneously for initiating a movement of said drive mechanism to move said balloon control rings and thread guides to the inoperative doff position, and means controlled by the movement of said devices to said inoperative doff position for arresting said drive mechanism.

13. In a twister frame having traversing elements including spinning rings and a ring rail, balloon control rings and a balloon control ring rail, thread guides and a thread guide supporting rod, the combination of a builder mechanism for imparting reciprocatory movement to said traversing elements in accordance with a rising reciprocating pattern for winding strand on a package, a windlass shaft, means operatively connecting the builder mechanism with said shaft, flexible supporting members connected with said shaft for supporting each of said ring rail, said balloon control ring rail, and said thread guide supporting rod, means for biasing said windlass shaft in a direction to move said traversing elements upwardly, a wind-down mechanism connected with said windlass shaft for winding down said traversing elements to a predetermined wind-down position including a wind-down shaft, and a flexible wind-down connection between said wind-down shaft and said windlass shaft for winding down said elements, and a wind-down drive mechnasim connected with said wind-down shaft operable to position said traversing elements in a predetermined wind-down position, a joggle mechanism including a joggling element movable against said flexible wind-down connection, and a vibratory supporting means for said joggling element, and means for actuating said vibratory support means to joggle said windlass shaft traversing elements, a device for shifting the thread guide rod and thread guides to an inoperative doff position, a device for shifting said balloon ring rail and balloon control rings to an inoperative doff position, an auxiliary drive mechanism connected to shift said devices simultaneously from normal to the inoperative doff position, and a post-doff wind-start control system including a starting control element, and connections actuated thereby to start the auxiliary drive for moving said balloon ring rail and thread guide rod from said inoperative position, control means actuated by movement of said thread guide and balloon control rings to the normal operating position to arrest said auxiliary drive, to start the twister frame, to operate said vibratory supporting actuating means and to effect said joggling movement, and a timing control actuated by said joggling mechanism to arrest said joggling movement and to start said wind-down motor and clutch in the rewind direction.

14. In a twister frame having traversing elements including a ring rail and spinning rings thereon mounted for vertical reciprocatory movement for winding strand on a package, the combination of mechanism for imparting reciprocatory movements to said traversing elements in accordance with a reciprocating pattern movable lengthwise of the package comprising a builder mechanism including an element having a builder motion, and connections including flexible supporting means connected between said builder motion element and said traversing elements, biasing means acting upon said connections biasing said traversing elements lengthwise of said package against said builder motion element, a joggle mechanism comprising a joggling device, and means connecting said joggling device with said connections for imparting a rapid vibratory movement thereto against said biasing means, power means for operating said mechanism for imparting reciprocatory movement to said traversing elements, and control means to initiate operation of said mechanism for imparting reciprocatory movements to said traversing elements and at the same time to operate said joggle mechanism during a limited period.

15. In a twister frame having traversing elements including a ring rail and spinning rings thereon mounted for vertical reciprocatory movement for winding strand on a package, the combination of builder mechanism for imparting reciprocatory movements to said traversing elements in accordance with a reciprocating pattern movable lengthwise of the package having a builder cam and connections including flexible supporting members connected between said builder cam and said traversing elements, biasing means acting upon said connections biasing said traversing elements lengthwise of said package against said builder cam, and actuating means for said mechanism for advancing said traversing elements moving in accordance with said pattern from a start-wind to a fully wound position, a wind-down mechanism comprising an actuator, and a flexible wind-down connection between said actuator and said flexible actuating connections operable to move said traversing elements in the reverse direction from said fully wound position to a wind-down position, a joggle mechanism including a joggling element, and vibratory supporting means on which said joggling element is moved against said flexible wind-down connection to joggle said windlass shaft traversing elements.

16. In a twister frame having traversing elements including a ring rail and spinning rings thereon mounted for vertical reciprocatory movement for winding strand on a package, the combination of mechanism for imparting reciprocatory movements to said traversing elements in accordance with a reciprocating pattern movable lengthwise of the package having a builder cam and connections including flexible supporting members connected between said builder cam and said traversing elements, biasing means acting upon said connections biasing said traversing elements lengthwise of said package against said builder cam, and actuating means for said mechanism for advancing said traversing elements moving in accordance with said pattern from a start-wind to a fully wound position, a wind-down mechanism comprising an actuator, and a flexible wind-down connection between said actuator and said flexible actuating connections operable to move said traversing elements in the reverse direction from said fully wound position past said starting position to an extreme wind-down position, means operable thereafter for reversing said actuator for positioning said traversing elements in the starting position, and means for resetting said traversing element moving connections of a length corresponding with said extreme wind-down position of said traversing elements, a joggle mechanism including a joggling element movable against said flexible wind-down connection, power operated vibratory supporting means for said joggling element operable to joggle said windlass shaft and traversing elements, control means for placing said actuating means in operation and simultaneously for operating said vibratory supporting means for a limited period.

17. In a twister frame having traversing elements including a ring rail and spinning rings thereon mounted for vertical reciprocatory movement for winding strand on a package, mechanism for imparting reciprocatory movements to said traversing elements in accordance with a reciprocating pattern movable lengthwise of the package comprising flexible supporting members connected with said traversing elements, biasing means connected with said flexible supporting members biasing said traversing elements upwardly, a reciprocatory motion producing device, flexible actuating connections between said device and said flexible supporting members arranged to exert a pull on said members opposed to said bias for transmitting reciprocating motion to said traversing elements, and means acting on said flexible connections for advancing said traversing elements moving in accordance with said reciprocatory motion from a start to a fully wound position, the combination of a wind-down and joggle unit which comprises a wind-down shaft, a flexible wind-down connection between said wind-down shaft and said flexible actuating connections, a joggle shaft parallel with said wind-down shaft, and a joggle element supported eccentrically on said joggle shaft for engagement with said flexible wind-down connection, a wind-down motor, separate clutch connections between said motor and each of said wind-down shaft and said joggle shaft, and a control mechanism including means for operating said motor and for engaging said clutch connection with the wind-down shaft for winding down said traversing elements, and a separate control mechanism operable in starting the twister frame to operate said motor and to engage said joggle clutch for a limited period.

18. In a doffing and starting mechanism for a twister frame having traversing elements including a ring rail and spinning rings thereon mounted for vertical reciprocatory movement for winding strand on a package, mechanism for imparting reciprocatory movements to said traversing elements in accordance with a reciprocating pattern movable lengthwise of the package from a start position comprising a builder mechanism including an element having a builder motion, and connections including supporting members connected between said builder motion element and said traversing elements, the combination of a joggle mechanism comprising a joggling device, and means connecting said joggling device with said connections between said builder motion element and said traversing elements for imparting a rapid vibratory movement to said traversing elements, power means for operating said joggling device and for operating said mechanism for imparting reciprocatory movement to said traversing elements, and control means for said joggle device and mechanism for imparting reciprocatory movements to said traversing elements operative upon starting a winding operation to effect a preliminary joggling of said connections and traversing elements, and to initiate the reciprocatory movement of said traversing elements.

References Cited by the Examiner

UNITED STATES PATENTS

| | | | |
|---|---|---|---|
| 2,982,487 | 5/1961 | Newton | 242—26.1 |
| 3,072,350 | 1/1963 | Anderson et al. | 242—26.1 |

MERVIN STEIN, *Primary Examiner.*